W. W. WYTHE.
Apparatus for Determining Distances Between Railroad Trains.
No. 155,214. Patented Sept. 22, 1874.
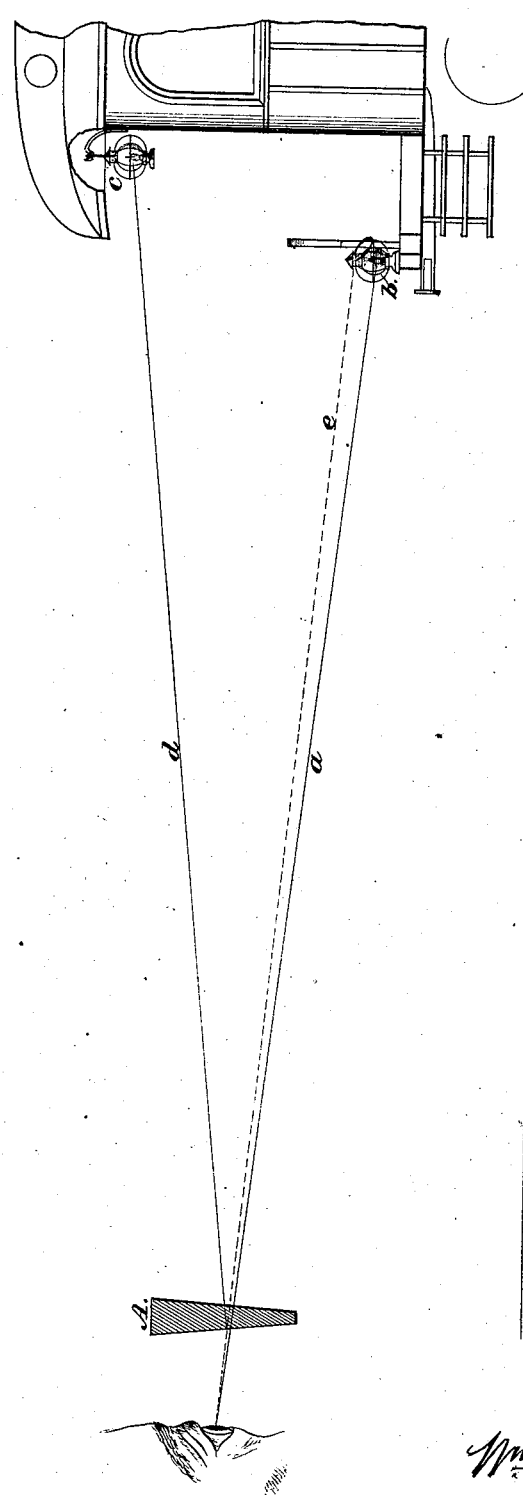
Witnesses:
A. Wythe.
C. Wythe.
Inventor:
Wm. W. Wythe.

UNITED STATES PATENT OFFICE.

WILLIAM W. WYTHE, OF MEADVILLE, PENNSYLVANIA.

IMPROVEMENT IN APPARATUS FOR DETERMINING DISTANCES BETWEEN RAILROAD-TRAINS.

Specification forming part of Letters Patent No. 155,214, dated September 22, 1874; application filed January 24, 1874.

*To all whom it may concern:*

Be it known that I, WILLIAM W. WYTHE, of Meadville, in the county of Crawford and State of Pennsylvania, have invented certain Improvements in Apparatus for Determining the Distance Between Railway-Trains, and their relative speed, for the prevention of collisions at night, of which the following is a specification:

My invention consists of a prism of glass or other transparent substance, made with its sides of a very acute angle, and which is placed in the front window of the locomotive-engine, and is used in connection with signal-lights on the rear of other trains, as follows;

On the rear end of a train is fixed two or more lights, in such a way that one is on a higher level than the other, but not in the same vertical plane. These lights may be of the same or different colors. For the sake of illustration, let a white light be placed upon the upper left-hand corner of the rear end of the car, and a red light on the right-hand corner of the platform of the same end, so that there will be a vertical distance of from six to twelve feet, as may be desired. Then, when a locomotive-engine follows the train with the aforesaid prism fixed in its window, and the engineer looks through the prism toward its right-hand edge, where it joins the plain glass of the window, in such a manner that he sees the left-hand light through the prism, but the right-hand light directly through the window, the effect will be that the rays which pass through the prism will be refracted, and the apparent place of that light will be altered according to the distance of the trains from each other. The angle of the prism is to be so adjusted to the distance between the lights that when the trains are a safe distance apart the lights will appear to be upon the same level plane; but whenever they come within the prescribed distance they will vary in elevation and give warning of danger. Thus, in the case supposed, when the lights are viewed through the prism, with its base or thickest edge upward, the white light will appear to run upward in case of danger, while, when the trains are beyond the limit allowed, the red light will appear uppermost.

The drawing shows a vertical section of the prism, with the rays proceeding from the signal-lights toward the eye.

A is the prismatic window, and *b c* the lanterns on the forward train, at different elevations. *a* is a ray proceeding from the light *b*, and, being seen directly through the window, beyond the edge of the prism, is not refracted, but appears in its natural position. *d* is a ray proceeding from the light *c*, and passing through the prism to the eye is refracted so that it appears to come from the direction shown by the dotted line *e*.

The proportion always being constant between the base-line A *b* and the perpendicular *b c*, when the refraction equals the perpendicular distance the horizontal distance is known.

I do not confine myself to placing the prism in the window of the engine, as it may be made so portable as to be carried in the pocket, and used in the same manner as an ordinary eye-glass, if so desired.

I claim—

A system of railroad-signaling and distance-measuring devices, consisting of a prism at one point, whether stationary or in motion, and at another point two signals arranged in different horizontal and vertical planes, substantially as and for the purpose set forth.

WM. W. WYTHE.

Witnesses:
 A. WYTHE,
 C. WYTHE.